United States Patent
Ribi

(10) Patent No.: US 11,390,407 B2
(45) Date of Patent: Jul. 19, 2022

(54) PLANT FOR PACKING PVC BOTTLES OR OTHER SIMILAR CONTAINERS IN PACKS BY APPLYING BAND-LIKE BINDINGS CALLED ALSO AS STRAPS

(71) Applicant: Leon Ribi, Troistorrents VS (CH)

(72) Inventor: Leon Ribi, Troistorrents VS (CH)

( * ) Notice: Subject to any disclaimer, the term of this patent is extended or adjusted under 35 U.S.C. 154(b) by 367 days.

(21) Appl. No.: 16/628,262

(22) PCT Filed: Jun. 18, 2018

(86) PCT No.: PCT/IB2018/054451
§ 371 (c)(1),
(2) Date: Jan. 3, 2020

(87) PCT Pub. No.: WO2019/012352
PCT Pub. Date: Jan. 17, 2019

(65) Prior Publication Data
US 2020/0216206 A1 Jul. 9, 2020

(30) Foreign Application Priority Data

Jul. 10, 2017 (IT) .......................... 102017000077504

(51) Int. Cl.
*B65B 35/44* (2006.01)
*B65B 27/04* (2006.01)
(Continued)

(52) U.S. Cl.
CPC .............. *B65B 35/44* (2013.01); *B65B 11/04* (2013.01); *B65B 11/045* (2013.01); *B65B 11/58* (2013.01);
(Continued)

(58) Field of Classification Search
CPC ......... B65B 35/44; B65B 27/04; B65B 21/06; B65B 35/58; B65B 61/14; B65B 11/04; B65B 11/045; B65B 11/58; B65B 11/585; B65B 13/02; B65B 21/26; B65B 21/04; B65G 47/252; B65G 2201/0244; B65G 57/28; B65G 2201/0252
See application file for complete search history.

(56) References Cited

U.S. PATENT DOCUMENTS 3,073,086 A * 1/1963 Martin .................... B65B 27/04
53/399
3,354,602 A 11/1967 Doets
(Continued)

FOREIGN PATENT DOCUMENTS

CH 710938 10/2016
DE 1008644 5/1957
(Continued)

*Primary Examiner* — Gloria R Weeks
*Assistant Examiner* — Mobeen Ahmed
(74) *Attorney, Agent, or Firm* — Themis Law

(57) ABSTRACT

A plant for packing bottles or similar containers includes an operating unit carrying out a rapid assembly that includes a portable pack made by three straps: a first one applied on the lower half of the body of the bottles, a second one applied at the neck of the bottles, both arranged on planes perpendicular to the vertical axes of the bottles, and a third one applied loosely and perpendicularly to the other two straps and laying on a vertical plane passing through the center of gravity of the pack.

22 Claims, 16 Drawing Sheets

(51) Int. Cl.
*B65B 11/04* (2006.01)
*B65B 13/02* (2006.01)
*B65B 11/58* (2006.01)
*B65B 21/06* (2006.01)
*B65B 35/58* (2006.01)
*B65G 47/252* (2006.01)
*B65B 21/26* (2006.01)
*B65G 57/28* (2006.01)

(52) U.S. Cl.
CPC .............. *B65B 13/02* (2013.01); *B65B 27/04* (2013.01); *B65B 11/585* (2013.01); *B65B 21/06* (2013.01); *B65B 21/26* (2013.01); *B65B 35/58* (2013.01); *B65G 47/252* (2013.01); *B65G 57/28* (2013.01); *B65G 2201/0244* (2013.01)

(56) References Cited

U.S. PATENT DOCUMENTS

| | | | |
|---|---|---|---|
| 3,388,791 A * | 6/1968 | Walsh | B65D 21/0205 206/428 |
| 3,908,812 A * | 9/1975 | Graff | B65B 21/20 53/247 |
| 4,179,022 A * | 12/1979 | Grocke | B65B 57/20 198/442 |
| 5,040,662 A | 8/1991 | Clark | |
| 7,797,913 B2 * | 9/2010 | Gorrieri | B65B 11/42 53/461 |
| 2003/0097817 A1 * | 5/2003 | Cere | B65B 11/585 53/398 |
| 2008/0283370 A1 * | 11/2008 | Monti | B65G 47/256 198/867.01 |
| 2012/0210674 A1 * | 8/2012 | Perl | B65B 27/04 53/589 |
| 2014/0041534 A1 * | 2/2014 | Hartl | B65B 13/18 100/2 |
| 2014/0238881 A1 * | 8/2014 | Stuhlmann | B65D 71/50 206/427 |
| 2016/0159506 A1 * | 6/2016 | Zahn | B65B 35/30 156/64 |
| 2017/0001748 A1 * | 1/2017 | Zahn | B65B 41/04 |
| 2018/0002051 A1 * | 1/2018 | Kannengiesser | B65B 61/14 |
| 2019/0217979 A1 * | 7/2019 | Ribi | B65B 13/185 |
| 2020/0024019 A1 * | 1/2020 | Miner | B65B 69/00 |
| 2020/0270008 A1 * | 8/2020 | Oppici | B65B 35/44 |

FOREIGN PATENT DOCUMENTS

| | | |
|---|---|---|
| DE | 202016002638 | 6/2016 |
| EP | 0860384 | 8/1998 |

* cited by examiner

PLANT FOR PACKING PVC BOTTLES OR OTHER SIMILAR CONTAINERS IN PACKS BY APPLYING BAND-LIKE BINDINGS CALLED ALSO AS STRAPS

In the today state of the art the PET bottles 1 for beverages are packed in packs of four or six elements mainly by means of sheets of heat shrinkable plastic polymers.

The present invention relates, instead, to another rapid packing method and thus a new type of safe and economic plant by using band-like bindings, i.e. straps that can be applied with convenient and specific devices by means of conventional strapping machines.

Said machines already exist since long time for packaging boxes, trunks or various containers but have not yet been employed industrially for packing PET bottles. Only occasional experimental efforts are known that however give poor results in terms of efficacy and with poor implementation results.

Object of the invention is to implement a plant for strapping specifically bottles but also other similar containers, which plant can overcome the drawbacks of the current attempts and make the strapping technology usable also for packs of containers.

In particular the invention provides for realizing a particular type of pack where an arranged group of bottles comprises a predetermined number of bottles with a given relative position to each other and hold together by at least one, preferably two straps oriented perpendicularly to the axes of the bottles themselves. Said straps are also provided at a given distance from one another. A third loose strap is provided as arranged in a plane parallel to the axes of the bottles and surrounding at least one or both the horizontal straps thus forming a handle.

The invention achieves the afore mentioned objects by the combination of characteristics of claim 1.

The dependent claims are advantageous improvements of different embodiments of the plant according to the present invention.

Object of the invention is an embodiment variation of a plant according to the patent application CH475-15 describing a strapping machine for making packs consisting of orderly groups of bottles bound together by at least one, preferably two or more straps externally enclosing the group of bottles. Each one of the straps forms a closed fastening band extending in a plane perpendicular to the axes of the bottles of the plant.

In the embodiment according to the present invention the tower for lifting the bottles, at which, to the groups of bottles placed side by side and contacting and comprising a predetermined number of bottles with a given arrangement or a given relative position the two fastening straps are affixed along horizontal planes at different heights of the vertical extent of the bottles, i.e. along planes perpendicular to the axes of the bottles or parallel to the surfaces thereof intended to form the resting sides of the bottles or similar containers, is replaced with a strapping channel where the bottles are translated along a horizontal path and in laid down position with respect to the upright position, i.e. in which they are usually rested on their side intended to form the base side.

Each prearranged group of bottles, i.e. with a predetermined number of bottles and in the relative position of the bottles themselves corresponding to the final position of the pack provided with the straps, is fed to the devices applying the traps, in laid down position on a side, i.e. with their axes oriented substantially horizontally.

Preferably the groups of bottles are fed in sequence to one another as laid down on the largest side, the bottles of each group being held in the relative position corresponding to the position of the final pack provided with the straps.

Preferably but not exhaustively the bottle group is fed to the first strapping station in laid down position on the largest side of said group, i.e. of an envelope solid of said group whose sides are tangent to the containers forming the group, and preferably the groups of the bottle sequence fed to the first strapping station are fed along a horizontal straight path in a holding channel.

According to an embodiment, downstream of a conveyor with horizontal conveying surface on which the bottles rest with their bottom, i.e. with their resting side, and the axes oriented vertically, a laying down station is provided which leads each group of the sequence from the position where the bottles are upright to the position where the same are laid down forward substantially by 90°, i.e. the bottles of each group are arranged with the mouth end oriented forward with reference to the feed direction. The first conveyor, along with conveying the bottles towards the first turning over station upstream of one or more following strapping stations, forms the sequence of bottle groups with the predetermined number of bottles for each group and in the relative position of the bottles with one another within each group. In the turning over station, each group of bottles of the sequence of bottle groups formed by the first conveyor is turned over by 90°, such that the bottles hold the relative arrangement of the group and said group is laid down ahead on a side, preferably the largest one. Specifically, the bottles of each laid down group are arranged with their axes parallel to the feed direction, i.e. horizontally or alternatively with the resting sides perpendicular to the feed direction.

Downstream of the turning over station at least one strapping station is provided and comprises a conveying horizontal channel having such sizes to form at least two opposite horizontal bottle holding surfaces, an upper one and a lower one, each one of which surfaces is intended to cooperate with a face of the bottle group, i.e. with the shell surfaces of the bottles forming the two side faces which, in the upright position, made the front side and the rear side of the bottle group with reference to the feed direction.

According to an embodiment said holding channel or duct has an entry section wherein at least two opposite walls thereof are each composed of a belt or ribbon conveyor with a straight branch contacting the bottles of the group;

an intermediate section applying the straps where two devices applying the straps are provided;

an end exit branch for the bottle groups wherein the bottles are bound with each other by the straps.

According to a further characteristic in the holding duct of the strapping station the entering bottle groups push forward the bottle groups in the strapping station and in the exit portion thanks to the feed push exerted onto the entering group by the belt conveyor, the three holding channel sections having a length substantially corresponding to the axial extent of the bottles, whereby the bottles of the sequence of bottle groups that are in the various channel sections are contacting with each another respectively with the mouths of the bottles of the following group against the bottom of the bottles of the immediately preceding group. Therefore, in the afore said holding channel according to an exemplary embodiment, a sequence of three groups of bottles is formed and the entering group pushes the groups preceding the same.

According to still a further characteristic, downstream of the exit section a turning over device is provided which brings each group of the sequence from the laid down position back to the upright position, i.e. to the position corresponding to the one preceding the laying down.

According to an embodiment, the passage from the exit segment of the holding channel of the first strapping station and the turning over device occurs due to the feed push of the bottle groups preceding the one in the exit section of said holding channel.

Downstream of the turning over device, still with reference to the feed direction, the bottle groups are fed in sequence thanks to a conveyor, for example a horizontal bar conveyor to a second strapping section where the strap forming the handle is applied correspondingly and similarly to what described with reference to the preceding exemplary embodiment.

According to an embodiment which can be provided in combination with one or more of the preceding characteristics, the laying down station comprises in combination:

an abutment surface having a first position wherein said abutment surface is transverse to the feed direction and is oriented parallel to the front side, that is to the side facing the feed direction of the bottle group formed on the upstream conveyor, that is parallel to the axes of the bottles in the upright position, which surface can be swung from said first position parallel to said front side of the bottle group in at least one second position parallel to the feed direction and substantially perpendicular to the first position and vice versa;

a plate supporting the side of the bottle group corresponding to the rest side of the bottles and therefore perpendicular to the axes of the bottles, as well as having a first position where it is oriented in the feed direction as an extension of the upstream conveyor and which plate is also swinging from said first horizontal position to a second position where said plate is vertical and vice versa;

at least one actuator for the swinging motion of the abutment surface and the supporting plate, which actuator moves angularly the abutment surface and the supporting plate between the corresponding first position and the corresponding second position in a synchronized manner with each other and such to maintain, between the abutment surface and the supporting plate, a relative angular position substantially constant during the swinging movement between said first and said second position;

said abutment surface and said plate being members independent from each other.

According to a further characteristic, actuators are combined with the laying down station for displacing the bottle group in the laid down position in the feed direction towards a strapping station.

According to an embodiment the abutment wall, preferably several abutment walls, is/are provided radially protruding from a central hub rotatably supported on an axis and driven so as to rotate by a motor. Preferably four abutment walls are provided as cross oriented with one another and with the intersection point of the planes defined by the said four walls coinciding with the hub rotation axis, said hub being rotationally driven by steps of angular width of 90°, thereby one of the four abutment walls is always in the first position and the immediately preceding one is always in the second position.

In combination with what afore, the plate is cyclically displaceable along a roto-translatory annular path thereof from the first position to the second position and from the latter again to the first position.

In a preferred embodiment a plate is provided for each abutment wall.

A further embodiment provides that the actuators displacing the bottle groups from the laying down station to the following holding channel by means of which the bottle groups are fed to the strapping station or stations, are in the form of pushing members acting on the side of the bottles forming the rear side of the laid down bottle group, with reference to the feed direction.

Advantageously in this case, the pushing members are supporting plates, each supporting plate being mounted on a carriage of a sequence of movable carriages. The carriages are moved to a predetermined distance from each other along a closed annular path whose axis or axes are parallel to each other and with respect to the swing axis of the abutment walls. Advantageously the annular path surrounds the swing axis of the abutment walls.

The annular path has a straight or substantially straight branch oriented in the feed direction of the bottle groups towards the entry of the holding channel combined with the strapping station or stations, a return branch for the carriages in a position directly adjacent to the exit of the separating conveyor provided upstream the laying down device, said carriages being further rotated about a horizontal axis such to angularly move the supporting plates from said first position receiving the bottle groups to the second position corresponding to the laid down condition of the bottle group.

In particular, the feeding branch is straight and is an upper branch of the said annular path of the carriages and extends from an entrance provided adjacent to the exit of the separating/grouping conveyor to an exit adjacent to the entrance of the holding channel bringing the bottle groups in sequence with each other to the strapping station or stations.

According to a characteristic, the swinging rotation of the plates of the individual carriages between the entry position of the bottle group, where the plate is horizontal, and the bottles of the group are oriented in upright position, that is between the first horizontal position of the supporting plate, in the second position where said plate is vertical and where the bottle group has been laid down laterally forwards, occurs at the initial end of the straight portion of the annular path, then the carriage in said laid down position is caused to be advanced along the straight path till placing the bottles in the entry section of the holding channel of the first strapping station.

At the terminal end of the straight feed portion of the annular path of the carriages, the beginning of the return curved path that brings the carriages back to the initial position of the straight path, ready for loading a bottle pack fed from the upstream conveyor, is provided.

According to an embodiment, said path is composed of a curved track or guide starting at the terminal end of the straight portion of the path and ending at the initial end of said straight portion of the path and along which each carriage is transported by motorized means, while being contemporaneously swung such to swing the supporting plate between the two horizontal and vertical positions.

An advantageous embodiment provides that the annular path of the carriages is composed of two annular cams or guides each one running on a horizontal surface, said surfaces being parallel to one another and the two said guides coinciding with one another with reference to a horizontal axis thereof, while each carriage extends from one guide to another and comprises, on each end, a wheel or roller which are coaxial with one another and rotate about a horizontal axis, while they are engaged inside the corresponding cam or guide.

The carriages can be dragged by displacement actuating members or can be independently motorized.

An embodiment provides that the displacement along the straight feed branch of the annular path of the supporting plates, i.e. of the carriages bringing the same, occurs thanks to two motorized belts or ribbons which are vertically aligned in a predetermined relative position with the carriage ends, i.e. with the their rolling guides and each one having at least one or more teeth dragging the carriage which are spread along the extent of each belt at distances corresponding to the dragging of a bottle group of the sequence of bottles due to the engagement with the respective carriage.

Preferably each belt has two teeth equally spaced along its length and the belt length is tailored to the extent of the bottles such that each tooth pushes a corresponding group of bottles along the entire straight feed portion and when a first tooth is at the exit end of said straight portion and disengages from the carriage, the other tooth engages from behind the carriage combined with the following group of bottles just turned over to the laid down position.

According to still a further characteristic, in the station turning over the bottle groups that have been provided with one or more straps in the station or stations combined with the holding channel, from the laid down position to the upright position again, i.e. with the side of the group corresponding to the rest sides of the bottles provided horizontal, the turning over of the groups from the laid down position to the upright position occurs by an angular movement forwards and downwards about a horizontal axis coinciding with or close to the side of the group provided at the mouths of the bottles and which is in ahead position in the holding channel.

A wheel has at least one radial supporting plate having a first horizontal position aligned with the bottom side of the holding channel and, on such supporting plate, the groups of bottles coming from the holding channel are transferred in sequence, said plate being angularly displaceable from the horizontal position to the vertical position by a downward rotation, while on the radially external side the bottom sides of the bottles of the group slide on a circumferential curved holding wall that is coaxial to the swing axis of the supporting wall and which wall ends with a leading end towards the horizontal transport surface of a conveyor placed directly underneath the supporting wall in its vertical position.

Advantageously more than one supporting wall are provided, preferably four supporting walls cross oriented with each other and having the same eccentricity with respect to their angular movement axis.

Further improvements are object of the dependent claims.

The characteristics of the invention will result from the following description of a not limitative exemplary embodiment shown in the accompanying drawings wherein.

PLANT DETAILED DESCRIPTION AND OPERATION

Figure 1:
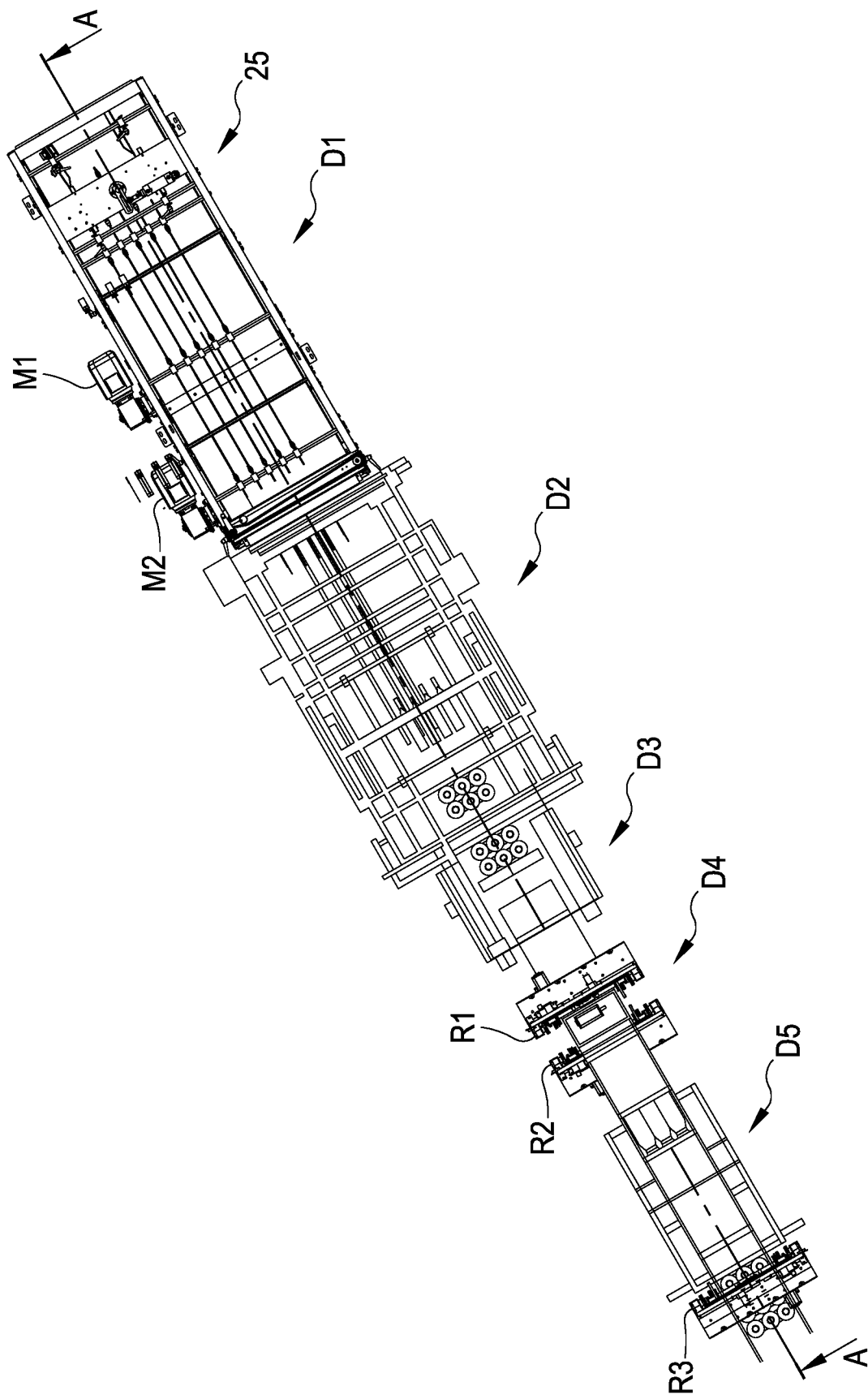
FIG. 1 depicts a general top plan view of the plant.

In the present description and the claims, with the term strapped is meant that a strap has been applied. The term strapping denotes applying one or more straps. The term strap means a flexible band-like element not elastically stretchable which is tightened around a group of objects, the two ends of said band being connected to one another such to firmly stay bound in the fastened condition.

The plant object of the present invention relates to an operating unit able to carry out a rapid assembly, i.e. a safe, simple and portable pack 1 made by three straps: one applied on the lower half of the body of the bottles 1, the second one applied at the neck of the bottles 1, both arranged on planes perpendicular to the vertical axes of the bottles themselves 1, the third one 1 being instead applied loosely and perpendicularly with respect to the other two straps, lays on a vertical plane passing through the gravity centre of the pack, i.e. it is arranged on a plane comprised between two adjacent rows of bottles 1 contacting each other for example in the plane separating the two rows of three bottles 1 of the standard pack of six bottles 1.

The bottles 1 conveyed by the conveyor belt NT, after a sorting area 25, reach the area 4 of the horizontal movement bars of the two movement, i.e. pre-assembling, devices D1 and D2 where they are arranged, along with the pusher bar 23 in the predetermined pack configuration.

This pre-assembling operation is carried out by the three devices D1, D2 acting in accordance with the pusher bar 23 and synchronously with the forward movement of the feeder conveyor belt NT. These three devices consist of chains 5 possibly sliding along annular rigid guides and parallel with each other and which are arranged at the sides of the conveyor belt NT. Said devices are driven by monitored electric motors M3, M4 and M5. To these chains 5 horizontal bars 4 are orthogonally fastened which move parallel to the surface of the feeder conveyor belt NT, the bars contacting the generatrices of the bottles 1 to be arranged.

The first device D1 has the function of making the provided rows of bottles transversally parallel and leaving them to the second device D2 which, in conjunction with the pusher bar 23, brings them together and pushes them on an entrance surface, in the position PosS, of a station D3 laying down the bottle group. Said surface is composed of a horizontal plate 11 supported by a carriage 10 slidably driven along an annular path extending in a vertical plane along the bottle feed direction, as it will be described more in detail in the following.

The bottles on the supporting plate 110 of a carriage 10 are moved forward against a transverse vertical abutment wall 11 as long as the vertical front side of the bottle group substantially coinciding with a surface tangent to the shell surfaces of the said bottles 1 in upright position comes into abutment against said abutment surface 11.

As a general rule, the supporting plate 110 and the abutment wall 11 are swingingly provided about a horizontal axis and in a synchronized manner with each other, thereby after the arrival and the positioning on the supporting plate 110 and against the abutment wall 11 of a group of bottles 1, both the supporting plate 110 and the abutment wall are swung forward, i.e. in the feed direction by an angle of 90°, making the bottles 1 of the said group be laid down forward, whereby the bottles themselves stay in the relative positions they had in the upright position, but their axes are horizontally oriented and the mouths of the bottles 1 are in ahead position with reference to the feed direction.

During the forward rotation by 90° which occurs from top to bottom, the abutment wall 11 takes a substantially horizontal position, while the supporting plate 110 takes an upwards projecting vertical position and, at the same time, the supporting plate is further moved upwards such to hold its relative position with respect to the abutment wall 11 during the swinging.

Figure 6:
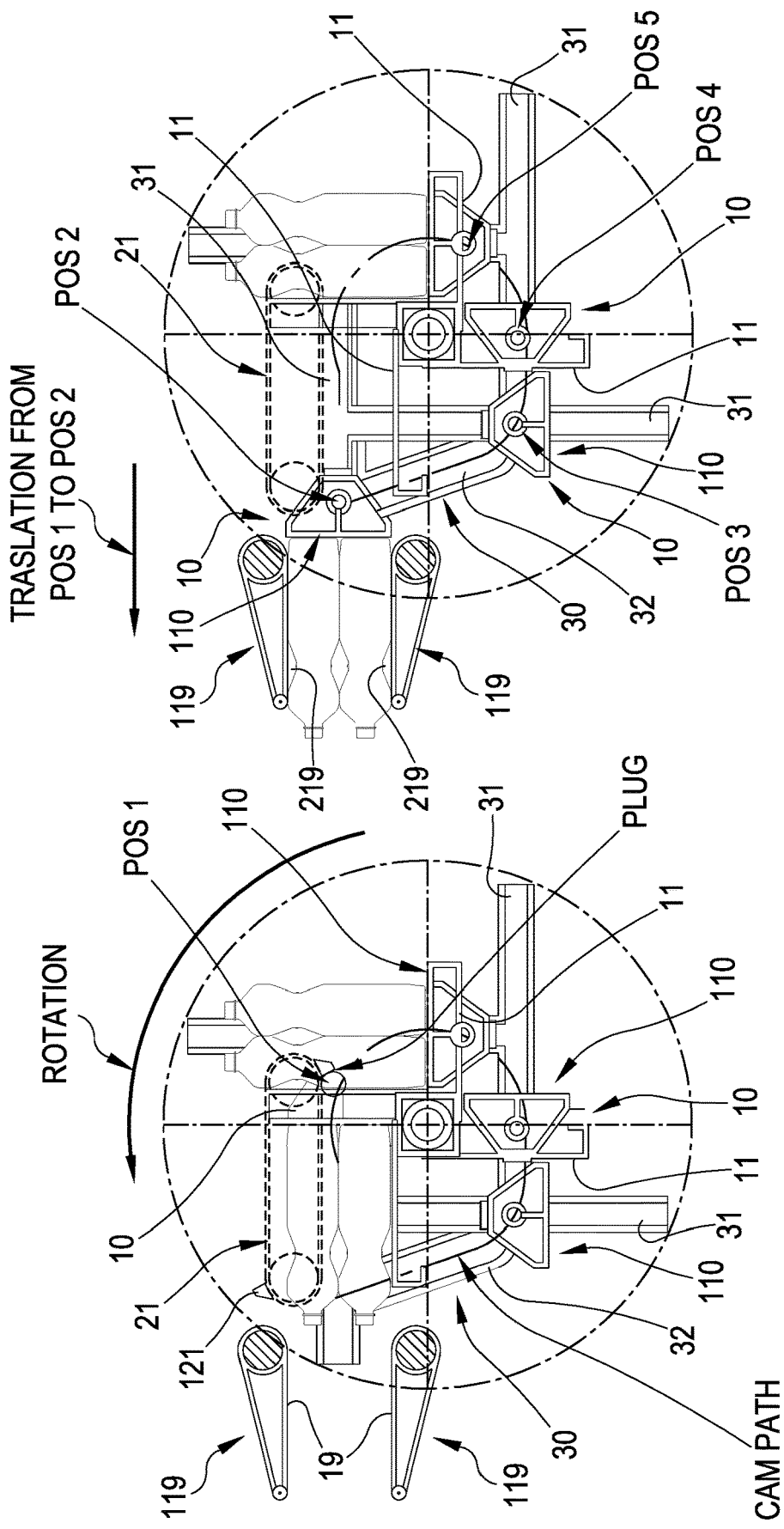
FIGS. 6A and 6B show two steps of the process for laying down a bottle group in the laying down station.
Figure 7:
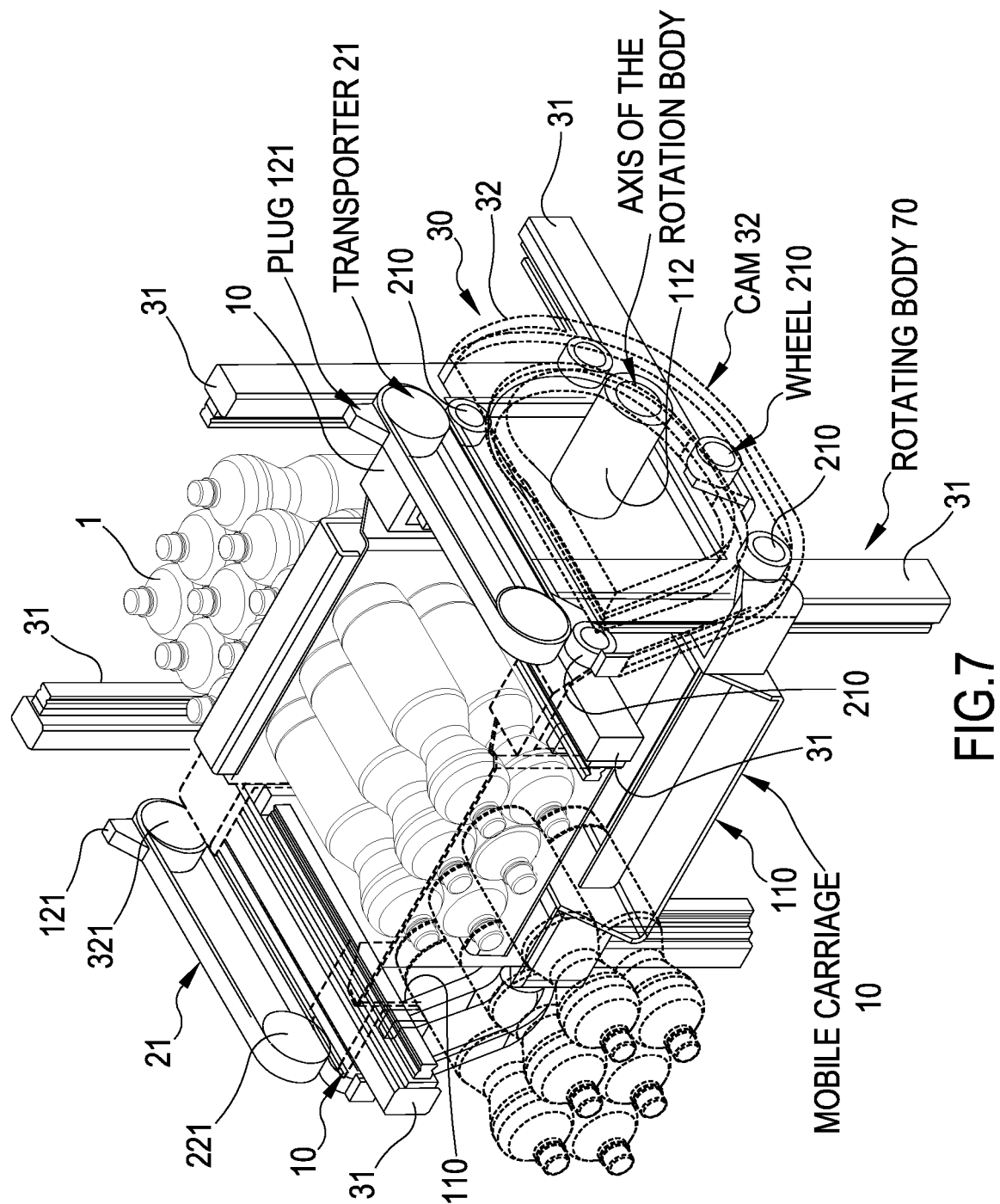
FIG. 7 shows an enlarged axonometric view of the laying down station where details not essential for the understanding have been omitted for the sake of clarity.
Figure 8:
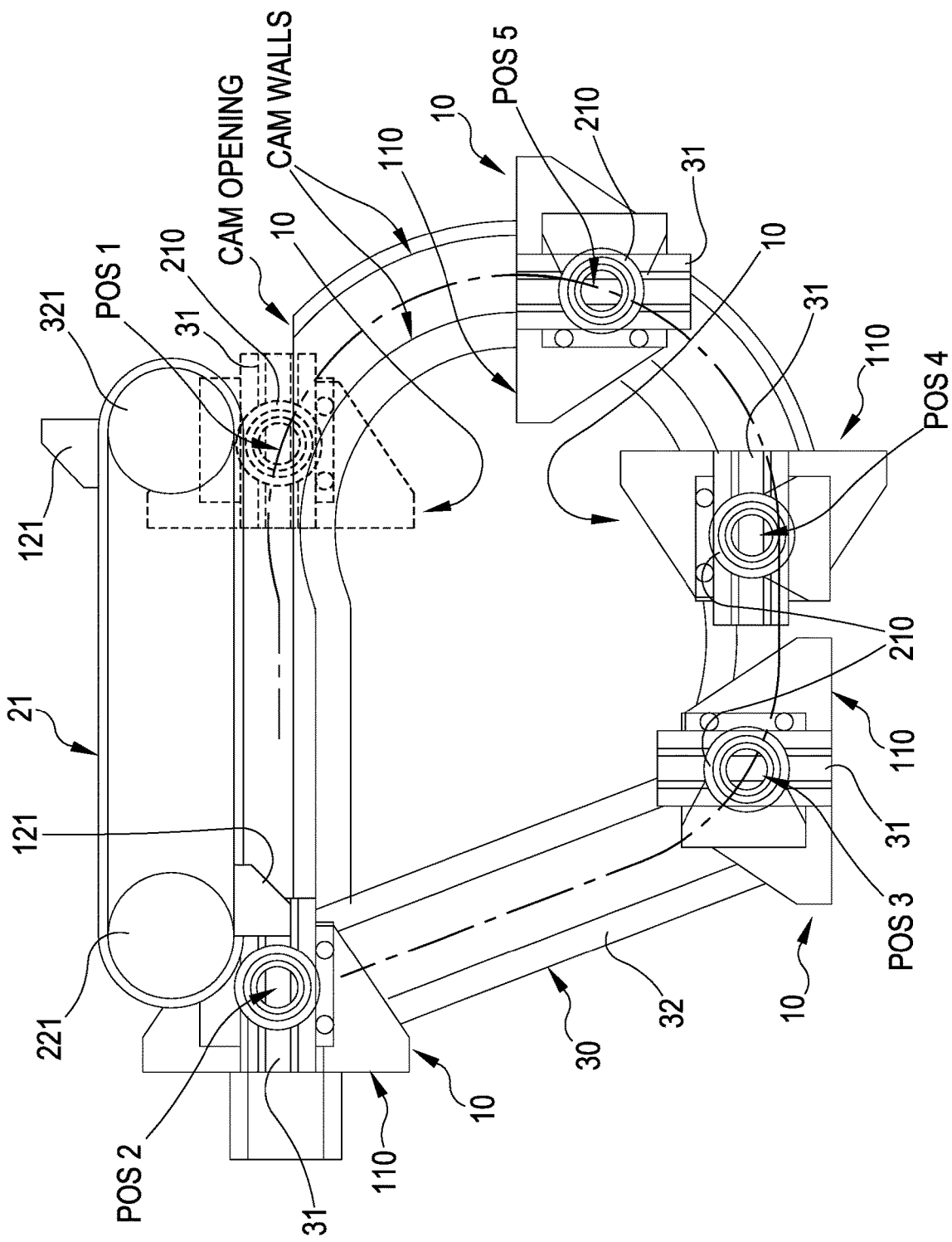
FIG. 8 is an enlarged and schematized side view of the laying down station.

In the POS1 position (FIGS. 6A, 6B, 8), the abutment wall 11 is interposed between two straight side shoulders laterally holding the group bottles in position.

Figure 2:
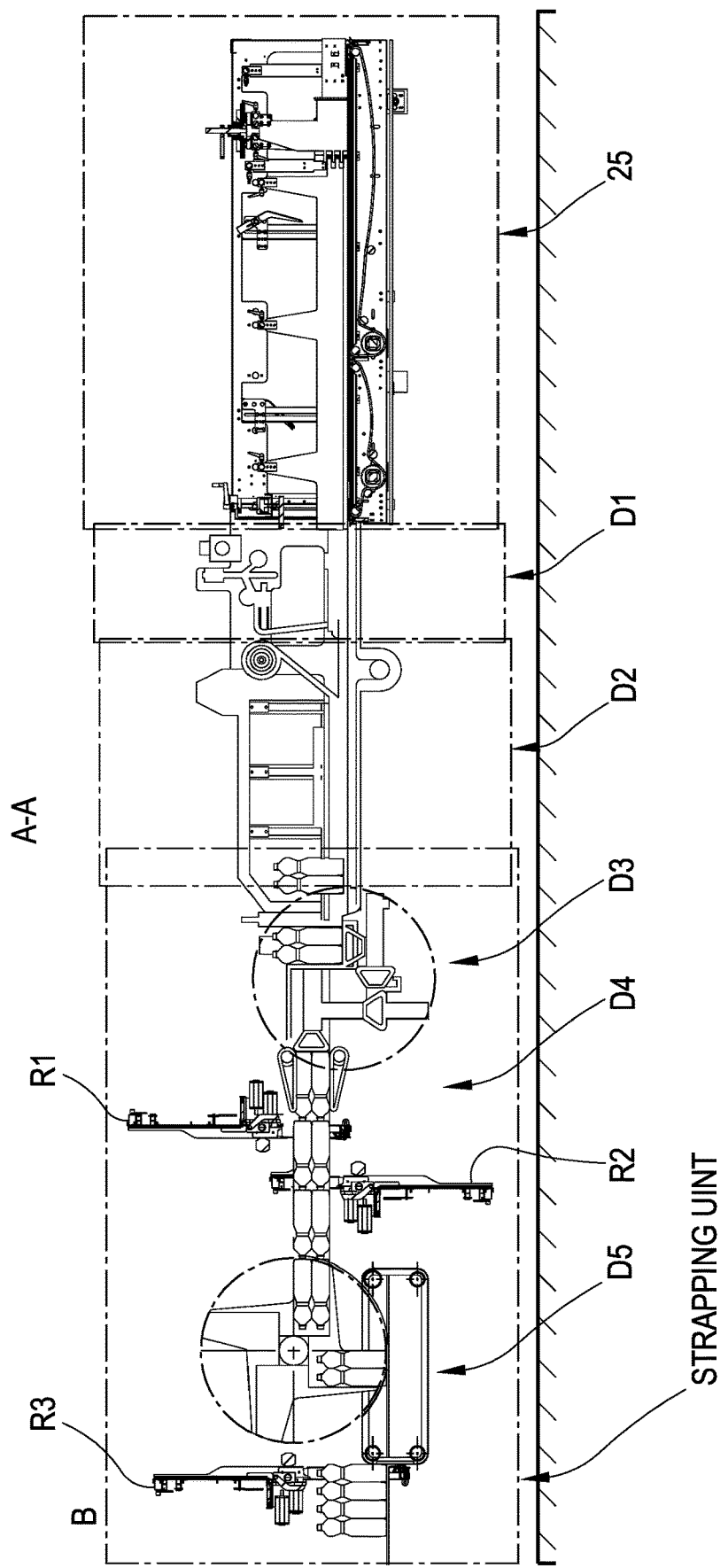
FIG. 2 depicts a side schematic view (without details of the movement devices D1, D2, D3, D4).
Figure 3:
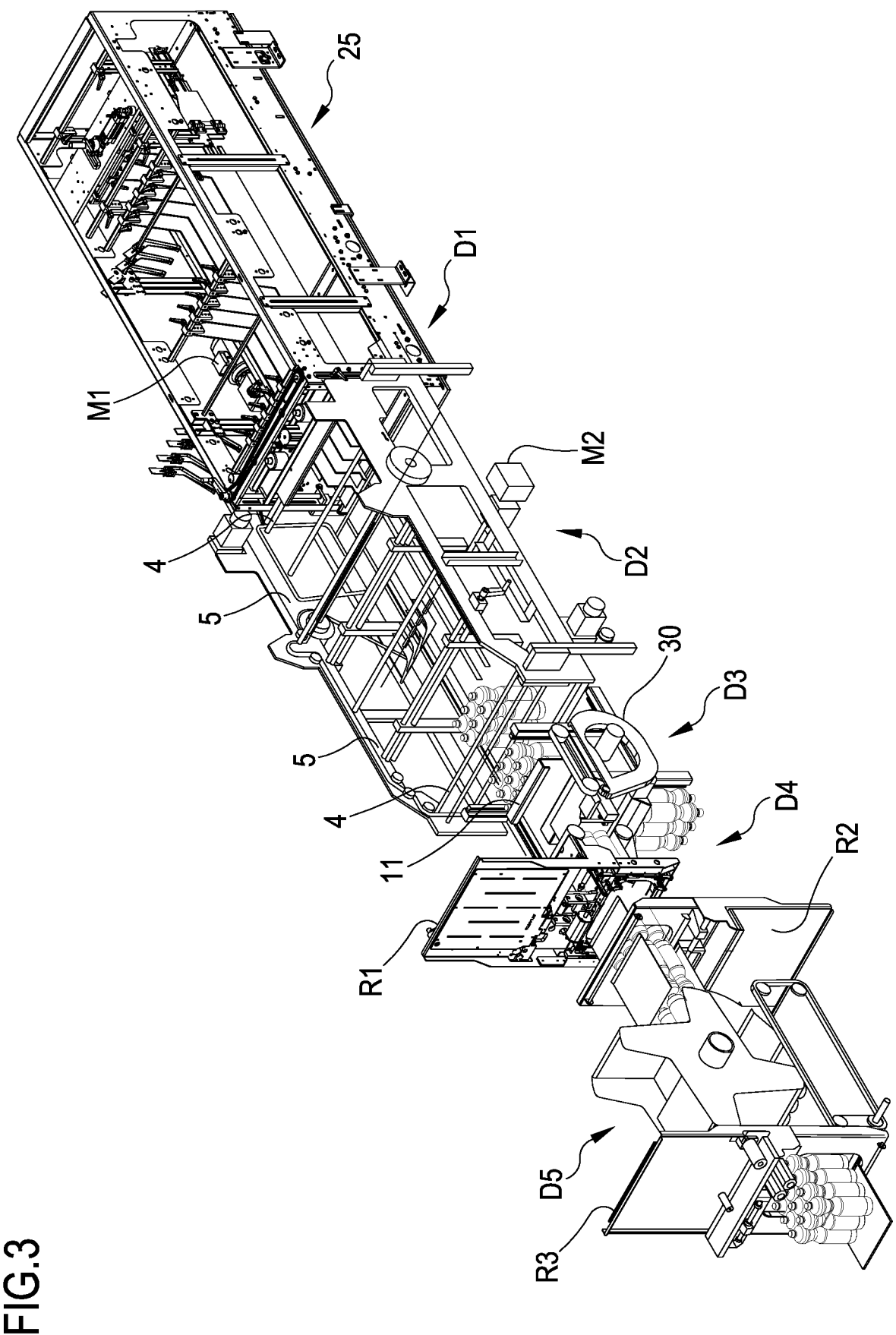
FIG. 3 depicts an axonometric projection of the plant according to the preceding figures.
Figure 4:
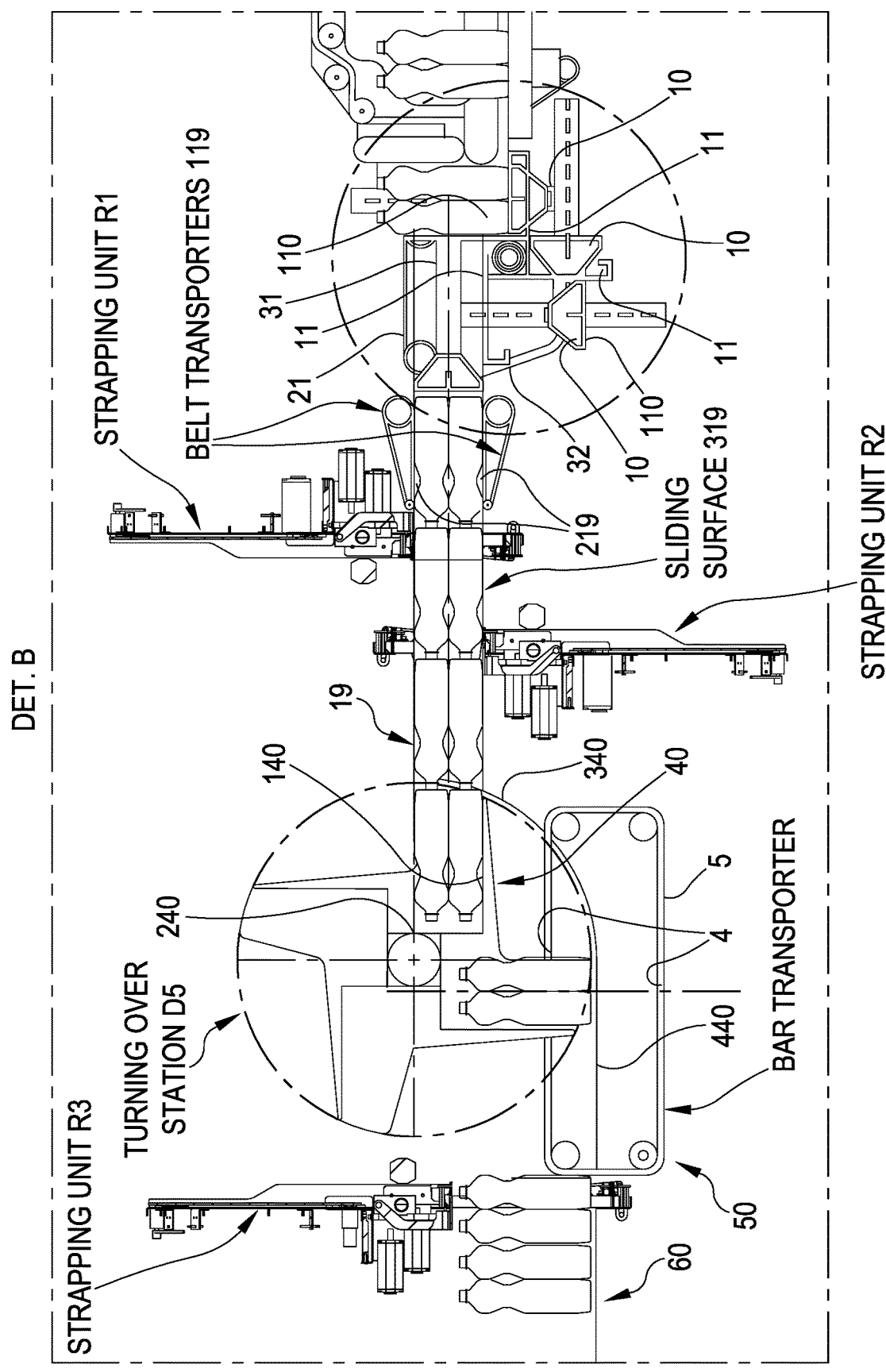
FIG. 4 depicts an enlarged and schematic side view of the plant corresponding to the laying down station, the following holding channel and the associated strapping stations, the station turning over the bottle groups the strap or straps have been applied to and the station applying the third handle strap.
Figure 5:
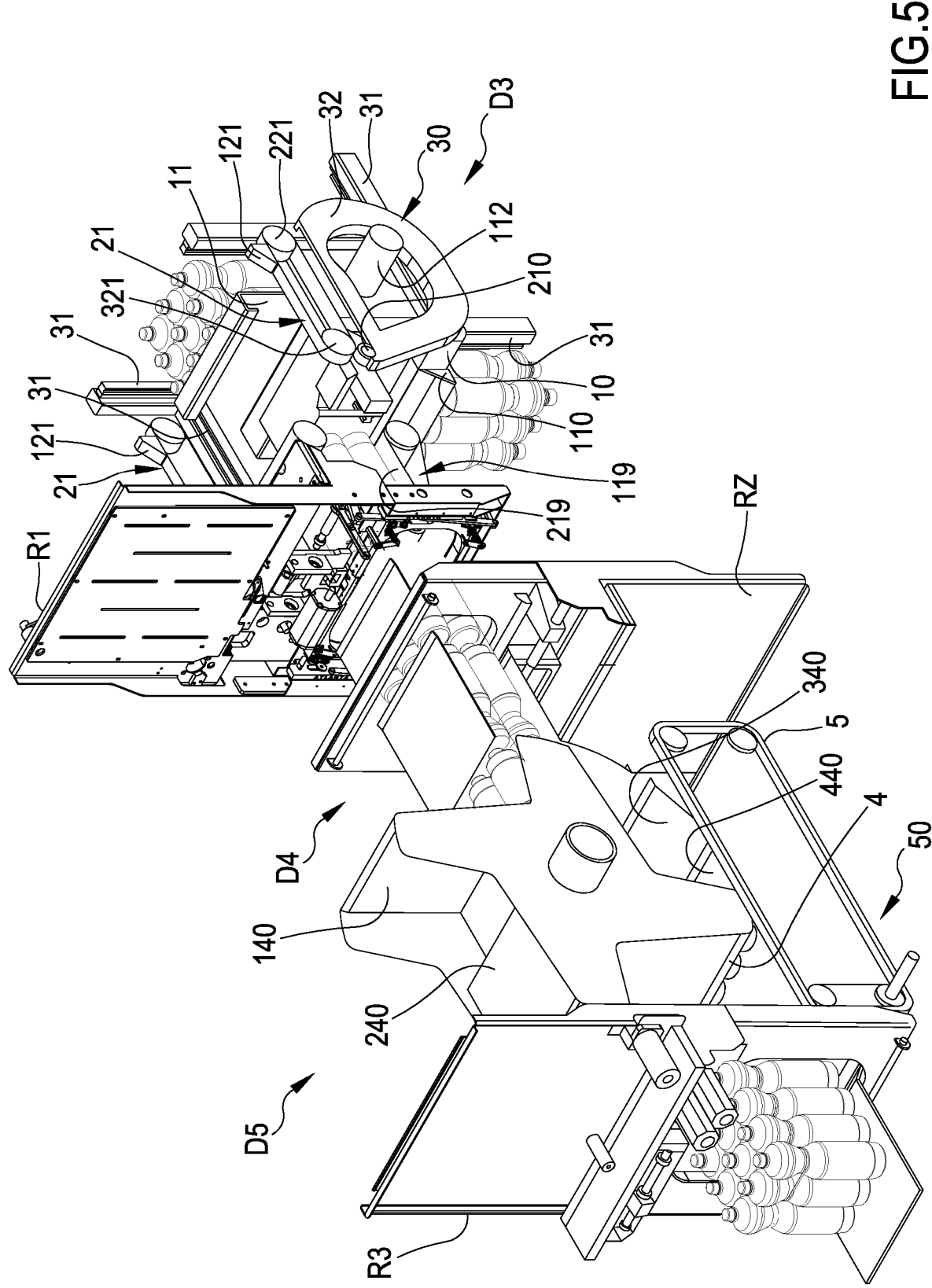
FIG. 5 is an axonometric view of the stations depicted in FIG. 4.

In the laid down condition, the supporting plate 110 mounted on the carriage 10 is used as pushing members for transferring the bottle group from POS1 to POS2 by means of a linear feed translation of the supporting plate 110 bringing the bottle group within a first portion of a holding channel of a first strapping station denoted by D4 in FIG. 2.

The embodiment shown provides that the laying down station D3 has four abutment walls 11, which are mounted radially projecting from a central hub 112 of a wheel 12 and are cross-shaped arranged with each other, i.e. with an angle of 90° among them. The central hub 112 is rotatable about a horizontal axis transverse to the feed direction, specifically and preferably perpendicular to the said feed direction of the bottles 1.

The rotation axis is preferably coincident with the intersection axis of the abutment walls 11. A motorized actuator not illustrated in detail rotates the wheel, by steps of 90°, bringing each abutment wall 11 alternatively to the position POS5 and the position POS1, i.e. the position vertically oriented upwards and against which the bottles abut in the upright position of the group exiting from the station D2 and the horizontal position where the abutment wall 11 supports downwards the bottle group laid down ahead.

With reference to the embodiment shown, the straight translation of the supporting plate 110 from POS1, where it is oriented vertically and with which the laid down bottle group is pushed to the position POS2 along the abutment wall 11 in the horizontal position and aligned with the bottom wall of the following holding channel 19 of the strapping station D3, occurs by means of a straight guide of the carriage where the same is engaged thanks to at least one wheel or roller 210 on each head side thereof oriented parallel to the feed direction, the wheel or roller rotating about an axis perpendicular to the feed direction of the bottles.

The carriage is slidingly dragged along the two straight side guides by means of straight branches of a belt, a ribbon or chain 21 having straight branches of length substantially corresponding to the translation path of the bottles laid down from the initial position POS1 to the end position POS2. The members 21 provided at the two longitudinal sides of the laying down station D3 along the translation path of the bottles in laid down condition, each one engage a dragging tooth 121 of a respective carriage by dragging or pushing the same along the straight path from said position POS1 to said position POS2. Advantageously, each belt has two teeth which are both provided in diametrical opposite positions at half the length of the belt itself.

The two members 21 are continuous and closed on themselves, extend in a vertical plane parallel to the feed direction of the bottles and are sent back around two end pulleys 221, 321 of which at least one is motorized. The teeth 121 are synchronized with each other such to engage together the same carriage by abutting with the corresponding end of the carriage 10 itself.

The laying down station comprises an assembly laying down the bottles that, as it is evident from FIGS. 3 to 8, comprises a plurality of carriages 10 which are in a number corresponding to the number of abutment walls 11 and each one of which carriages 10 brings a supporting plate 110 swinging from a horizontal position to a vertical position and vice versa.

According to a characteristic of the turning over station, the carriages 10 are engaged with each head end at the sides parallel to the feed direction with an annular guide thanks to the corresponding roller or the corresponding wheel 210. The guide denoted by 30 in figures consists of a rail formed by two concentric cam tracks delimiting a rolling channel of the rollers. The guide along the straight portion 31 is part of the annular path and completes the curved part 32 of the guide 30 ending open at its two ends, with one of these two ends at the initial end of the straight guide 31 and with the other end at the final end of the straight guide 31 along which the carriages carry out the action of translating the bottles.

The curved part 32 and the straight part 31 of the guide 30 form a closed path for each wheel or roller 210 of the carriages 10. The guide 30 defines a closed path extending along a vertical plane oriented in the feed direction. Along each lateral side of the laying down station D3, which is oriented in the feed direction, a guide 30 is provided for the corresponding roller of the carriages 10. The guides 30 on the two sides of the laying down station are aligned with each other in a coinciding manner with respect to a horizontal axis parallel to the rotation axis of the wheel carrying the abutment walls 11.

With reference specifically to FIGS. 6A, 6B and 7 and 8, during the translation along the path defined by the guides 30, the supporting plate 110 of each carriage takes different orientations as shown in the figures with POS1, POS2, POS3, POS4, POS5. These orientations can be obtained thanks to actuators for swinging the supporting plates 110 with respect to the carriage 10, each carriage 10 being provided with one of these actuators or else mechanical means can be provided which, along the path of the carriages 10, act on the same causing the corresponding supporting plate 110 to swing in the position defined for the position along the path reached by the carriage.

Also for the translation of the carriages 10 along the curved guide 32 the rollers 210 of the carriages can be provided to be motorized, each carriage being provided with a motor, or it can be provided that the movement of the carriages also along the curved guide 32 is caused by a dragging actuator separated by the carriages themselves.

In the embodiment shown the carriages are dragged along the path by a rotating body which is coaxial with the rotation axis of the wheel 12 carrying the abutment walls 11. The wheel 12 is advantageously the rotating body and brings, at the head ends, four pairs of straight guides 31 each one composed of straight parallel guides 31 aligned in the same horizontal surface within each pair. The pairs of guides are arranged perpendicular with each other and form the corners of a square coaxial with the axis of the rotating body. Furthermore each guide extends for the same extent over the area of intersection of the adjacent guide 31 oriented perpendicularly. The carriages 10 are slidingly supported with each of their head ends at a guide and such to hold the supporting plate 110 always perpendicular to the longitudinal extent of the guides 31 on which the carriage 10 is mounted. The pairs of guides of each carriage are oriented parallel to the corresponding abutment wall 11, thereby during the rotation of the rotating body each supporting plate still holds the orientation perpendicular to the associated abutment wall 11, while thanks to the combined action of the rollers or wheels 210 cooperating with the guide curved part 31 and the possibility of the carriages sliding along the corresponding straight guides 31 rotating about the axis of the rotating body 12, the carriages are brought along an annular path from the translation vertical position of the bottle group between the position 1 and the position 2, in the horizontal position of the supporting plate 110 facing downwards POS3 to the position oriented vertically downwards POS4 till taking the horizontal position facing upwards of the plate 110 POS5, where the laying down station can accept a new group of bottles.

This is clearly apparent from FIGS. 6A and 6B. Furthermore, thanks to the cam or guiding curved part 30, the carriage 10 is also subjected to a vertical translation among different positions.

The rotation of the rotating body occurs by means of an electrically controlled motor and synchronized with the motion of the translation bars of the device D2.

Downstream of the turning over station D3, a strapping station D4 is provided and comprises two strapping units R1 and R2 spaced apart from each other along a horizontal straight path of the group of bottles 1.

Advantageously, the bottle groups laid down in the laying down station D3 are transferred therefrom into a holding channel 19 formed by a plurality of sections and whose overall length is equal to a multiple of the axial length of the bottles.

Specifically with reference to the example shown, the holding channel is as long as a multiple of four of the axial length of the bottles and is thus able to simultaneously accommodate four groups of bottles. The bottles of the groups being behind the group at the exit end of the holding channel abut against the bottom sides of the bottles of the immediately preceding group of bottles. The entrance section of the holding channel 19 comprises at least one belt transporter 119, preferably two belt transporters, one of their straight branches 219 being part respectively of one of two facing side walls of the holding channel 19, for example of the horizontal dome wall and the horizontal bottom one. When the belt transporters 119 act on the bottles of the bottle group housed in the initial portion of the holding channel, this bottle group is pushed forward and the bottles of this group push forward all the three bottle groups in the holding channel preceding the one on which the dragging belts act, simultaneously a new bottle group is transferred from the laying down station D3 to the holding channel 19. The last group of bottles, i.e. the one on the exit side of the holding channel, is pushed outside the holding channel itself and into the inlet compartment of a turning over station D5.

The holding channel 19 comprises four holding walls of which two are lateral vertical and two horizontal, one of which forming the bottom channel side and the other one the channel dome. The size of the walls is such that in cross section, the port defined by the holding channel walls corresponds, by shape and size, to the port of the cross section of a parallelepiped enveloping the group of bottles.

The holding channel has, at two strapping units R1 and R2, openings for applying the straps to the group of bottles in the strapping unit R1 and R2.

Each strapping unit applies to each group of bottles a strap 24 extending in a plan vertical and transverse to the bottle axis, the arches of the strapping units R1 and R2 being arranged horizontally.

The strapping units are units of known and conventional type and are not object of the present invention per se.

A strap 24 is applied at the vertical plane coinciding with the lower half of the body of the bottles 1, while the second strap 24 is applied at the neck of the bottles 1 just under the extruded neck provided underneath the cap. During said strapping operations the bottles 1 are restrained, with minimum play, by the holding channel 19.

Once the bottles 1 have been vertically strapped in the holding channel and in their laid down position, the bottles 1 of the pack or group in the initial portion of the holding channel 19 push forward the sequence of group of bottles in the holding channel by moving a following group next to the strapping units R1 and R2 for applying the two straps 24 to said group.

The group ejected from the holding channel and provided with the straps 24 is fed to the turning over device 40 of the turning over station D5.

The turning over device 40 comprises at least one horizontal supporting plate 140 swinging about an axis horizontal and transverse to the feed direction of the group of bottles 1. The supporting plate 140 is in the same horizontal plane as the bottom wall forming the sliding surface 319 of the bottles in the holding channel 19.

According to a further characteristic, the swinging supporting plate 140 is integral with a vertical abutment wall and transverse to the feed direction of the bottles which is denoted by 240 and is swung together with the supporting plate 140 to which it is joined.

The swing axis is provided eccentric with respect to the supporting plate 140 and the abutting wall 240 and the bottles of the group are turned over from the laid down position they have when entering to the upright position thanks to a 90° swinging forward and downwards of the supporting plate 140 and the abutment wall 240, while the bottles of the group are hold by gravity against a radially outwards movement during the turning over swinging thanks to a curved sliding wall 340 which is substantially concentric with the rotation axis and which extends from the horizontal surface, where the supporting plate 140 is aligned in the position for receiving a group of bottles, to a substantial line of intersection or slightly apart from the latter, with a horizontal sliding surface 440 along which the groups of bottles 1 are horizontally translated thanks to translation bars 4 of a bar translator similar to the one provided for the stations D1 and D2.

Advantageously, the turning over station comprises four pairs of supporting plates 140 and the related abutment wall 240, which are cross-like oriented with each other i.e. with the abutment walls 240 arranged tangent to a common cylindrical hub rotating about its own axis and where each diametrically opposed pair of supporting plates 140 is laterally displaced with respect to a diametrical axis by the same extent and in the opposite direction to one another, in relation to said diametrical axis with respect to the rotation axis.

The bar conveyor 50 of the turning over station D5 pushes the bottle groups to an additional strapping unit R3 intended to apply a loose strap 24 enclosing both the straps 24 extending on planes perpendicular to the axes of the bottles, this loose strap 24 being oriented in a median plane of the bottle group and parallel to the axes of the bottles.

According to still a further characteristic, the strapping process can be completed by applying means bounding together at least two bottles, preferably the two central bottles of the bottle group such to prevent the rotation thereof.

Such a step can occur in different times of the flow of operation steps of the strapping process and according to a first variation, at the end of the strapping process or during or immediately before the application of the loose handle strap, glue may be applied by means of a device seeping a probe between the said two central bottles in their mutual contact area and that applies glue between these two bottles 1.

Said device is not described in detail in the present description but an exemplary embodiment thereof is claimed and described in the patent application n° CH1555/14 (publication number CH710938).

An outfeed conveyor 60 sends the groups of bottles 1 joined together by the straps and optionally the glue point to a further line of further grouping of the bottle packs and storage or loading on means of transportation.

Figure 9:
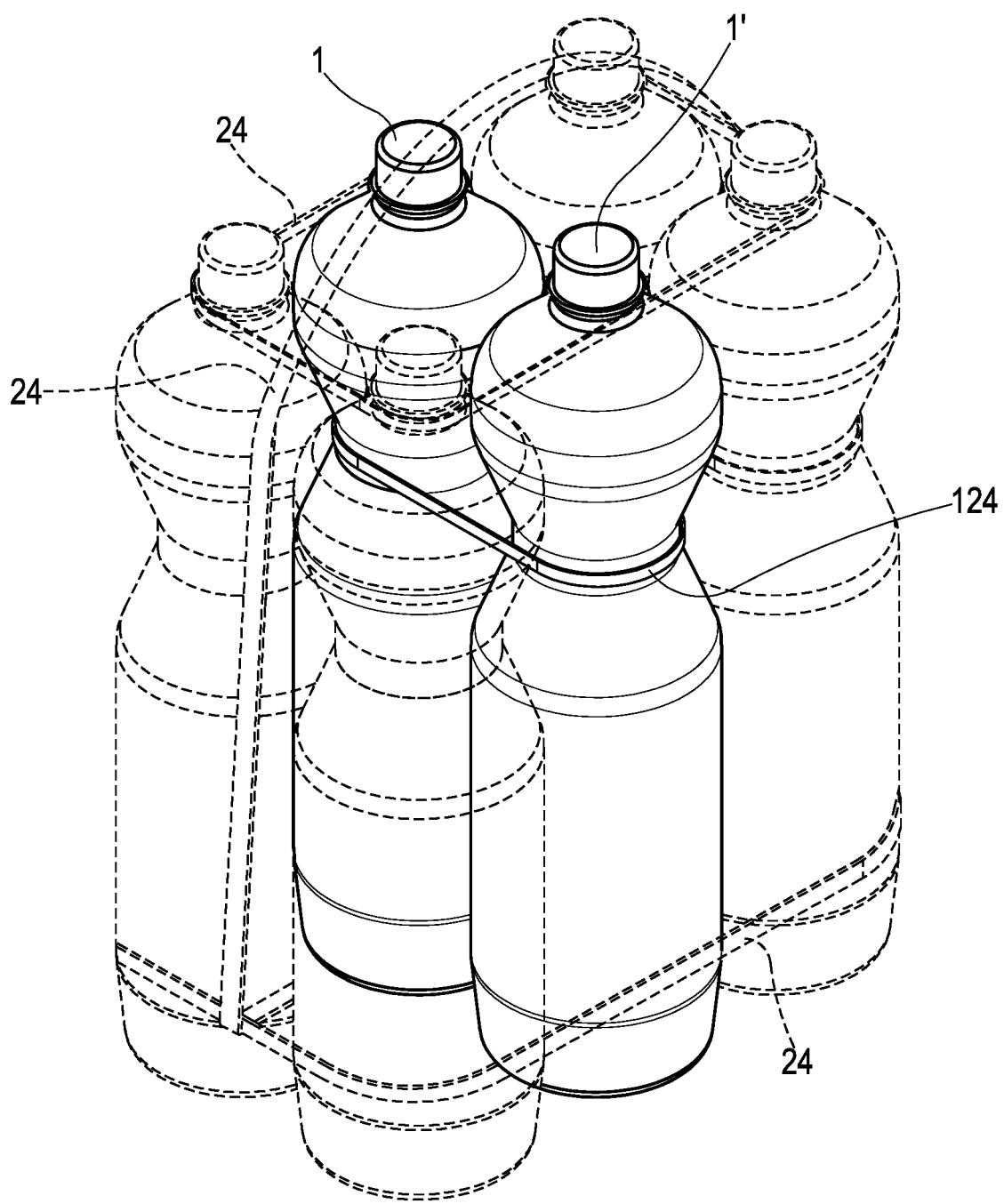
FIG. 9 shows a perspective view of an example of pack that can be made with the plant of the present invention.

With reference to FIG. 9, it shows a variation embodiment of the bottle anti-quincunx means that does not provide the application of glue as afore described. In this case the anti-quincunx action, i.e. the tendency of the containers to take a relative quincunx arrangement, is effectively avoided thanks to bonding together two containers 1, 1' provided in a central position of the pack by means of a strap enclosing these two containers and extending in a plane perpendicular to the axis of the containers themselves. The effect of the quincunx arrangement mostly occurs for groups of containers having six or more containers and where the containers are arranged on several lines and/or rows, the distance between two adjacent containers corresponding to a maximum diameter of said containers with respect to the central axis thereof.

Alternatively to the application of glue between two containers of the central row of the group of six containers denoted by 1', the present embodiment provides that, in order to substantially stop or prevent a counter-rotation of said two containers with respect to one another, said two containers 1, 1' are further bound to one another by a predetermined fastening force thanks to a strap 124. The fastening force is calculated such to generate friction between the contact areas of the containers 1, 1', substantially stopping or preventing the counter-rotation. This expedient has proven to be functional to prevent the passage of the containers from the aligned to the quincunx position.

With reference to the plant, such a further strap connecting the two central containers takes place in a pre-strapping station provided upstream of the grouping/assembling conveyor denoted by 25, D1 and D2 in figures.

The pre-strapping station not illustrated in detail can provide a pusher bar pushing two bottles in the feeding flow, which bottles are intended to take a central or intermediate position in the group of containers of the type similar to the one operating for grouping and assembling the entire group of containers, and a unit for applying one or more straps similar to the one provided in the first strapping area.

According to a further variation, when the groups of containers provide a larger number of rows and lines and thus a number of containers larger than six containers, two or more containers can be bound together which are at least in intermediate position with respect to the arrangement of the remaining containers of the group, if not in central position.

The plant object of the present invention can also be advantageously used for strapping containers similar and/or equivalent to the PET bottles (1).

Figure 10:
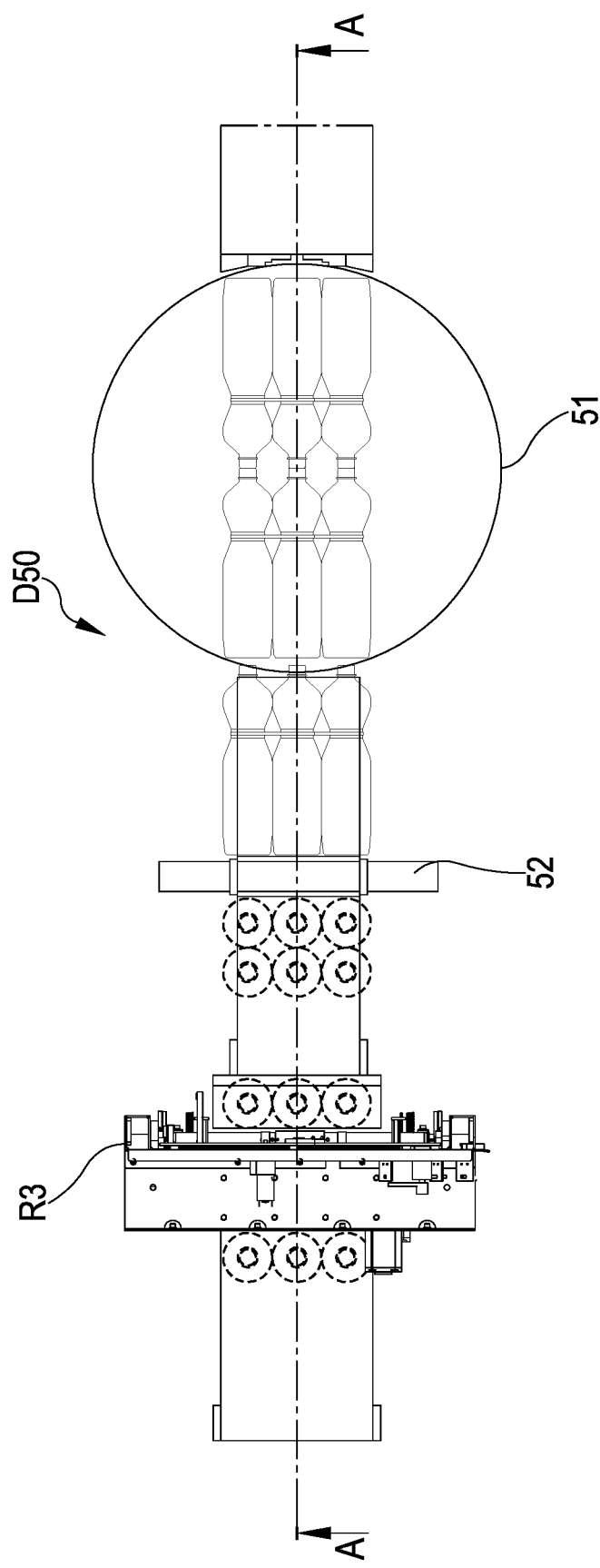
FIGS. 10 to 12 show different views of an embodiment variation of the turning over device that downstream of the laying down and strapping station brings the bottles, i.e. the bottle groups, back to vertical position for applying the strap forming the handle.
Figure 11:
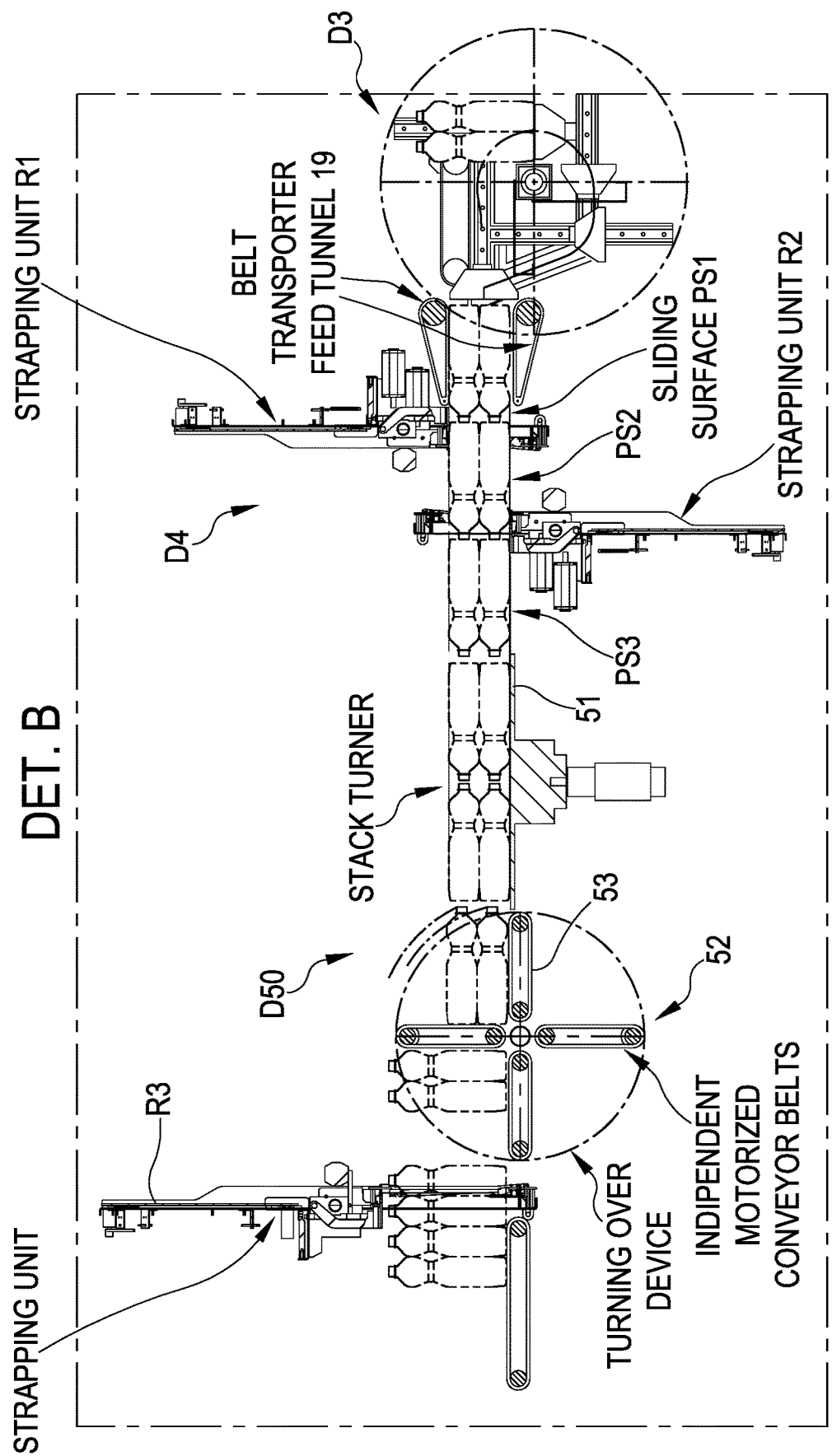
Figure 12:
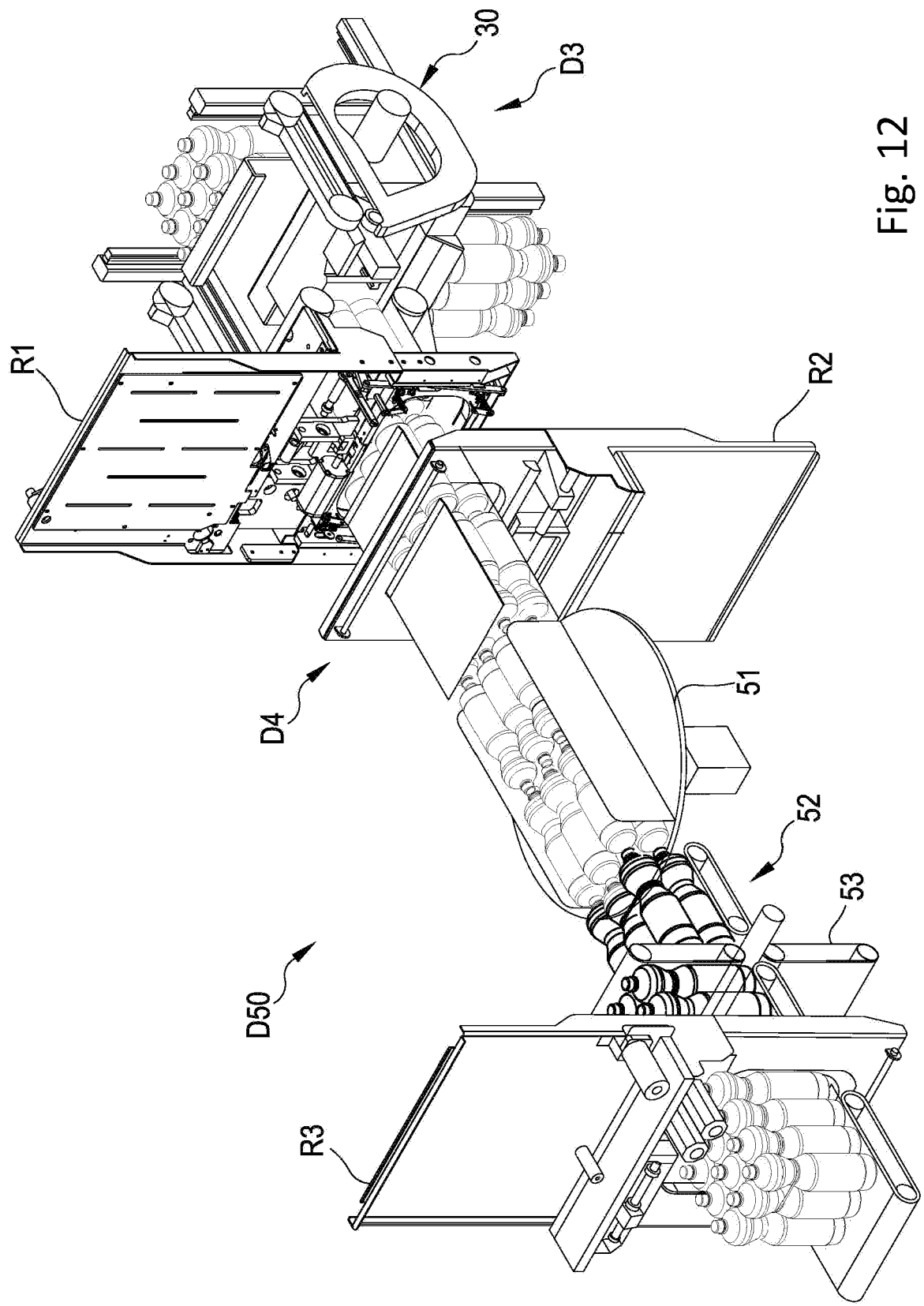

With reference to the embodiment variation of FIGS. 10 to 12, it is a machine according to preceding FIGS. 1 to 8 as regard to the stations 25, D1, D2, D3, D4, while the terminal turning over station is made differently. This turning over station 50 comprises a first table rotating by steps of 180° and denoted by 51 and rotating about a vertical axis, i.e. perpendicular to the axis of the bottles exiting from the strapping unit R2. The rotation of the stack turner table 51 brings the bottles entering said table, which are oriented with the ends provided with caps ahead, to a position where the same are oriented with the rest ends ahead. From the rotating table 51, the bottle groups are transferred to a turning over station 52 rotatable about a horizontal axis and having four motorized belt conveyor units 52. These are independent from one another and are cross-like arranged. By rotating the turning over device by 90° forward steps, one of the conveyor belts 52 forms a stop vertical wall for the bottles against which the front ends of the forward oriented bottles abut and that are the rest sides of the upright bottles, while a second belt 52 is the horizontal sliding and supporting surface of the bottle group entering the turning over device 52.

With the 90° rotation the bottles entering the turning over device 52 in laid down position are brought to upright position and then transferred to the strapping unit R3 that applies the strap in the vertical plane, for example the one intended to have the handle function.

Figure 13:
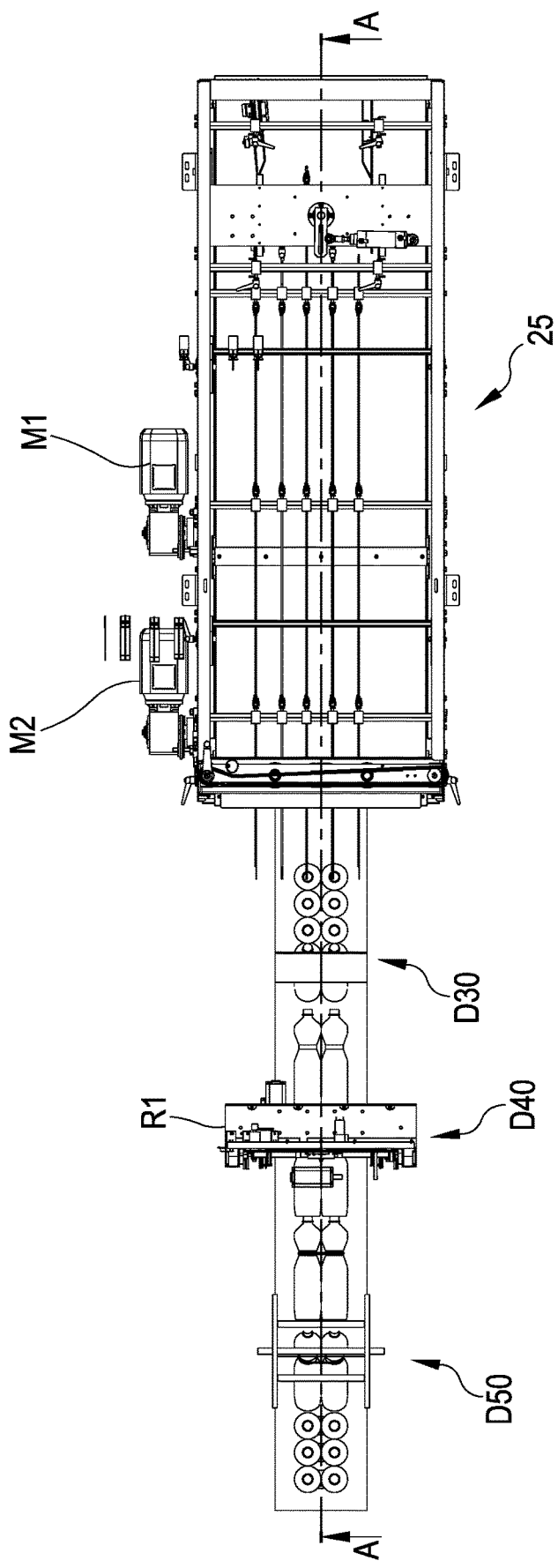
FIGS. 13 to 16 show a further embodiment of the terminal turning over station in a machine wherein two bottles are bound with each other such to form a pair of bottles.
Figure 14:
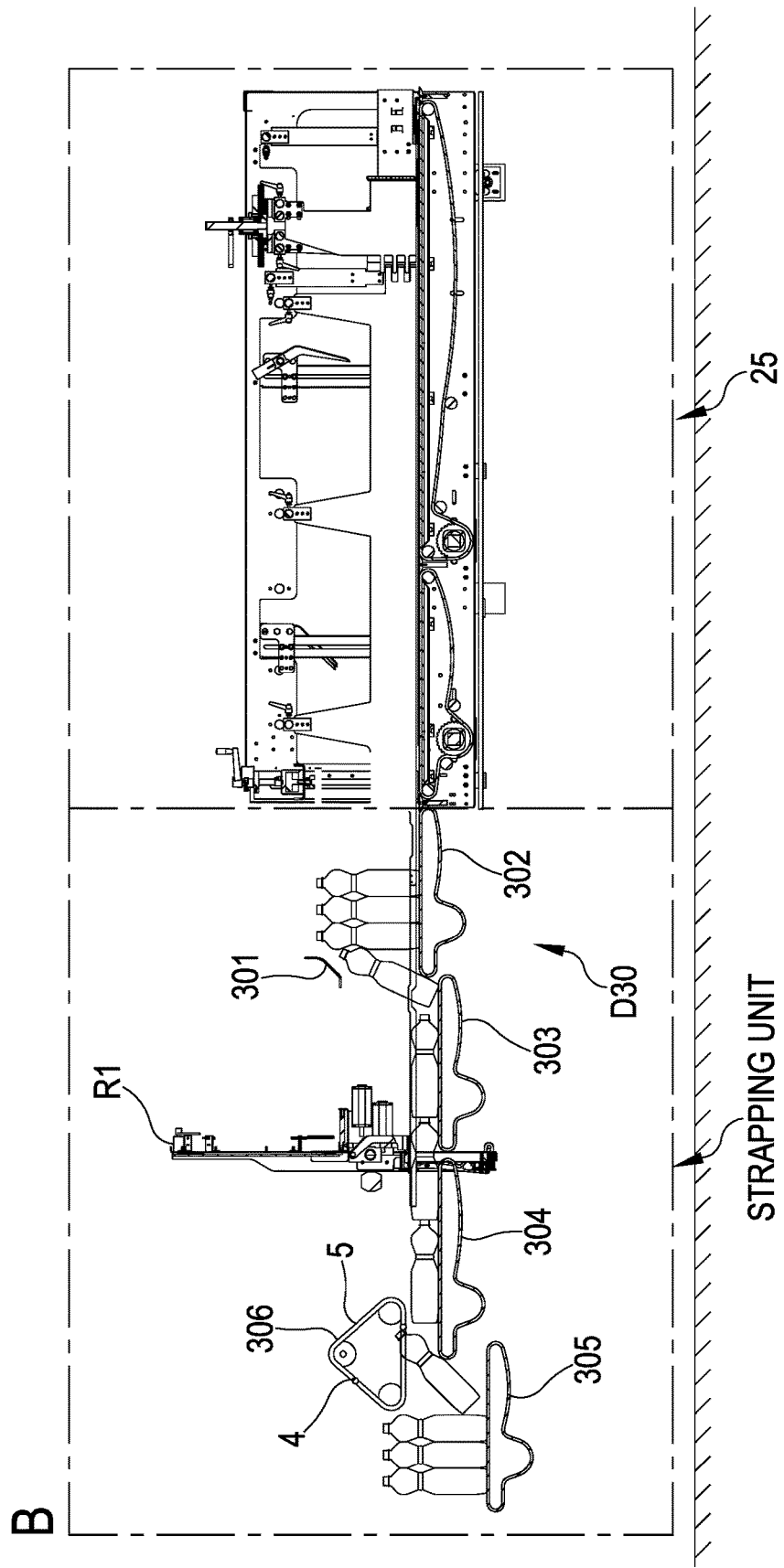
Figure 15:
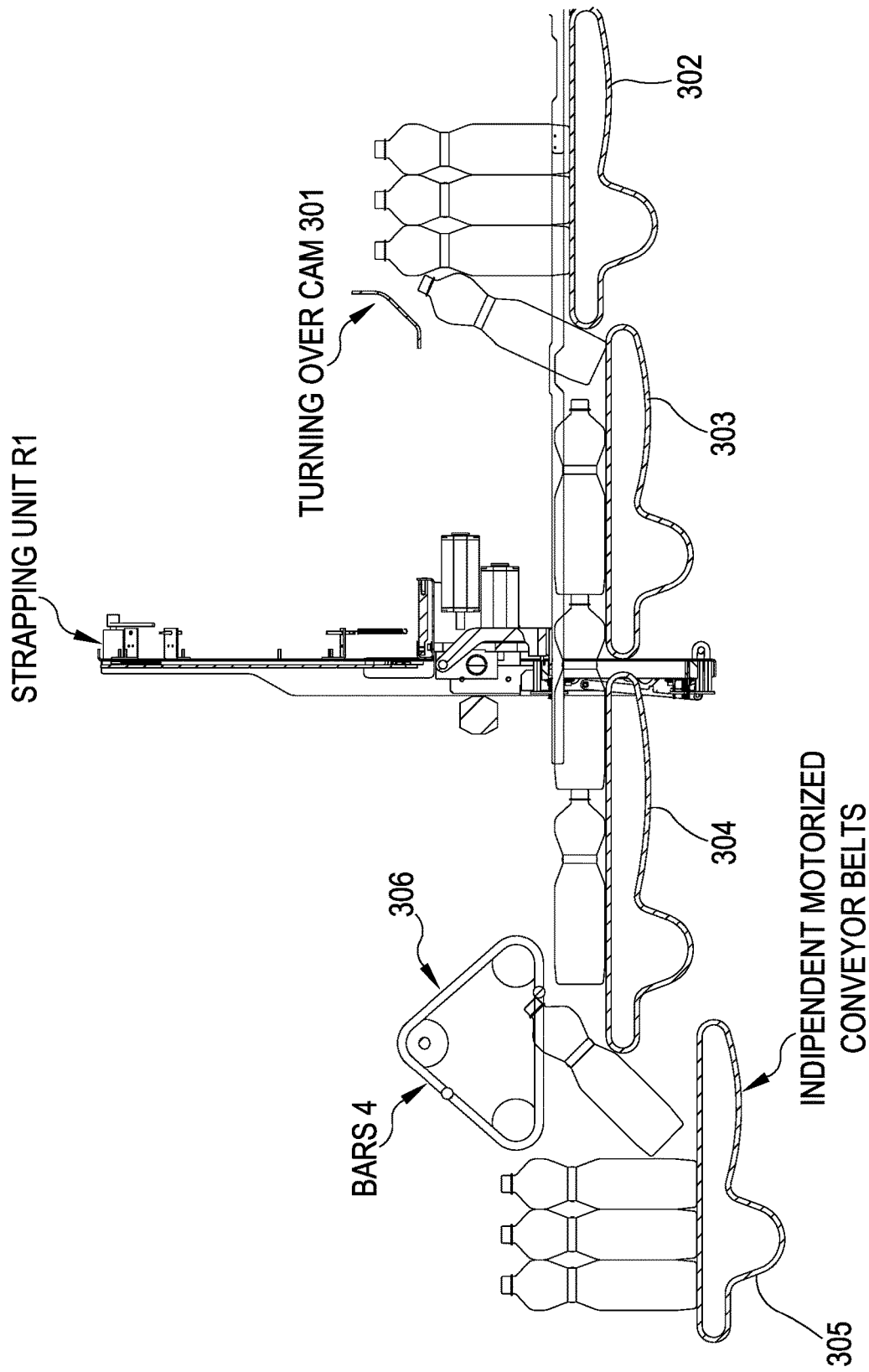
Figure 16:
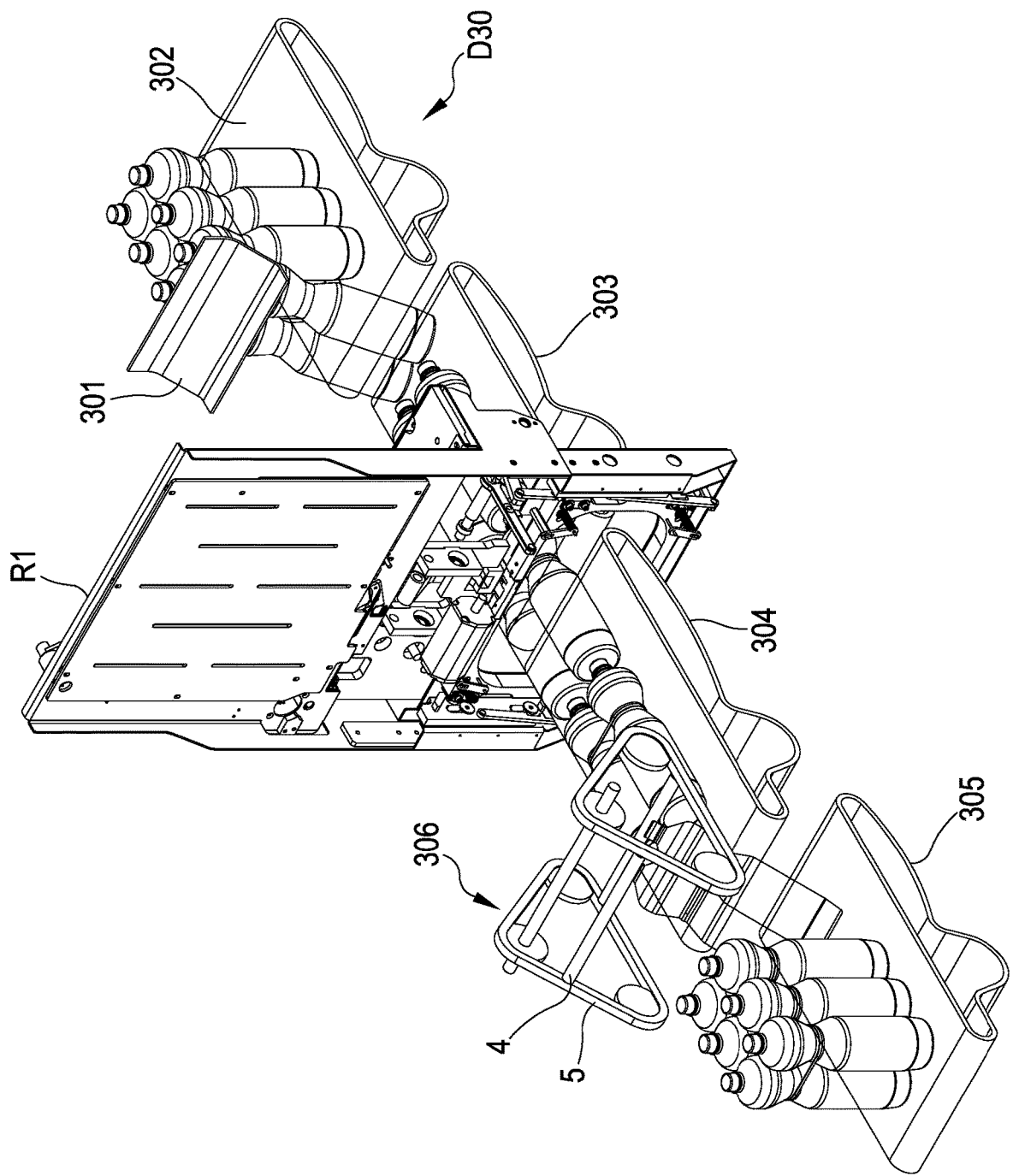

FIGS. 13 to 15 show still a further variation that advantageously applies to bind two bottles together.

This machine can operate as main feeding stage of a machine according to the preceding exemplary embodiments to which six bottles to be grouped are fed, of which the two central ones of the group formed by two lines of three bottles are constituted by the pair of bottles previously bound by the straps applied with the machine according to FIGS. 13 to 15. In this case this machine is upstream of the machine according to one of the two preceding embodiment variations and serves the same with the pair of central bottles of the group of bottles which are bound together by the purposely straps with respect to the entire group of bottles.

This has the advantage of effectively preventing the quincunx arrangement of the bottles in the group of six or more bottles bound together by the straps.

In this machine, as it is apparent from FIG. 14, a sorting area 25 of grouping/assembling conveyor member is provided, which is made according to what afore described, but limitedly to the feeding of groups made of only two bottles placed side by side.

These groups of bottles are fed to a strapping station that binds two bottles together with a strap. Downstream of the strapping station D40 a laying down station D30 and a turning over station D50 are provided.

The bottles arranged on two lines placed side by side are separated in groups of two bottles only and simultaneously brought to the laid down position thanks to a stationary cam 301 against which they are fed by a belt conveyor 302 on which they are arranged upright. Furthermore the laying down also occurs due to the fact that the conveyor 302 ends at the cam and a second conveyor 303 is provided, whose conveying surface is lower than the conveying surface of the conveyor 302. This drop makes the combination of the stationary cam 301 and the two conveyors 302 and 303 to progressively bring two bottles at a time to laid down position and placed side by side one to another. The conveyor 303 brings two laid down bottles to the strapping unit R1 from which they are drawn by a following conveyor 304. From the latter the two bottles bound together by a strap are brought to the vertical position thanks to an exit conveyor belt 305 that is provided with its conveying surface in a position lower than the conveying surface of the conveyor 304 and causing a tilting of the bottles with the end positioned ahead and corresponding to their rest side upright, downwards till contacting the exit conveyor 305, while a system of turning over ahead bars 306 that move along a closed path grabs from behind the ends of the bottles provided with cap and tilts them forward bringing them upright on the exit conveyor 305.

This station generates pairs of bottles bound together by at least one strap and that are fed to the machine according to one of the two preceding variations in order to generate a pack or group of bottles composed of four, preferably six bottles, which do not tend to be arranged at quincunx with one another. In this case, to the machines according to the two variations three lines of bottles are fed and in the central line the bottles are drawn by the machine according to FIGS. 13 to 16 and are bound together by pairs by a strap applied in a preceding step, while the additional bottles are separated from each other and are placed side by side to each central pair of bottles previously bound together. Each such formed group is then treated as described with reference to the machine according to FIGS. 1 to 8 or according to FIGS. 10 to 12.

Thanks to the previous coupling together of two central bottles of the group, the group of six bottles is prevented from being deformed, meaning that the six bottles are arranged in a quincunx way.

Of course, the herein described method also applies to bottle groups with more than six bottles.

LABEL 1, 1' Bottles (or other like containers)
2 Conveyor belt
4 Translation bars
5 Chains of the translation devices D1, D2, and D4
10 carriage
110 Supporting plate
210 wheel or roll
11 abutment surface or wall
12 wheel or rotating body
112 central hub
19 holding channel
119 belt transporter
219 straight branches of the belts
319 sliding surface
21 translation ribbon, chain or belt
121 dragging tooth
221, 321 end return pulleys of the ribbon, chain or belt 21
23 Pusher bar
24, 124 Straps
25 Grouping/assembling conveyor member sorting area
30 annular guide
31 straight section of the guide 30
32 curved section of the guide 30
40 turning over device
140 supporting plate
240 abutment wall
301 stationary cam
302, 303, 304, 305 belt conveyors
306 bar lifter
340 curved sliding wall
440 horizontal sliding track
50 bar conveyor
51 rotating table
52 conveyor belts
60 outfeed conveyor
D1 parallelizer of the bottle lines
D2 grouper
D3, D30 laying down station
D4, D40 strapping station
D5, D50 turning over station
M1, M2, M3 motors
R1, R2, R3 strapping unit
POS1, POS2, POS3, POS4, POS5 positions of the carriages with the supporting plate and of the abutment wall of the laying down station.

The invention claimed is:

1. A plant for packing packs comprising a plurality of bottles or other containers with straps, comprising:
a conveyor feeding the bottles, moved by a motor;
devices that assemble and prearrange a flow of the bottles along said conveyor to form bottle groups with a number of bottles and with a relative position of the bottles of each group identical to the relative position of a final pack;
a first station laying down the bottles of the bottle groups that turns over the bottles of each group from a position where the bottles are upright to a position where the bottles are laid down with axes of the bottles parallel to a feed direction, while maintaining together without changing the relative position of the bottles of each group with respect to each other when laying down;
a strapping station where, to the groups of a sequence of the bottle groups in a laid down position, one or more straps are applied extending on planes perpendicular to the axes of the bottles and vertical or transverse to the feed direction of the bottle groups; and
a second station turning over the bottle groups to which said one or more straps have been applied from the laid down position to the upright position.

2. The plant according to claim 1, further comprising a final station applying a loose strap extending on a plane parallel to the axes of the bottles.

3. The plant according to claim 2, further comprising a holding channel, which is horizontal and delimited by shell walls with size and shape corresponding to envelope walls of sides of the bottle groups which are parallel to the axes of the bottles, the holding channel being combined with the strapping station.

4. The plant according to claim 3, wherein the holding channel has a length corresponding to a multiple of an axial length of the bottles.

5. The plant according to claim 3, wherein at least two opposite horizontal holding surfaces of the holding channel are composed, at least partially for a length of an initial entry section of said holding channel, with reference to the feed direction of the bottles, of a belt transporter cooperating with the bottle groups entering said holding channel, the bottles of said groups being a pushing member advancing preceding bottle groups within the holding channel.

6. The plant according to claim 3, wherein said holding channel has:
- an entry section, wherein at least two opposite walls thereof are each composed of a belt or ribbon conveyor with a straight branch contacting the bottles of each group;
- an intermediate section applying the straps where two devices applying the straps are provided; and
- an end exit branch for the bottle groups, wherein the bottles are bound with each other by the one or more straps.

7. The plant according to claim 1, wherein the first station comprises in combination:
- an abutment surface having a first position, wherein said abutment surface is transverse to the feed direction and is oriented parallel to a front side facing the feed direction of the bottle groups formed on the conveyor upstream and parallel to the axes of the bottles in an upright position, the abutment surface being arranged to be swung from said first position parallel to said front side to at least one second position parallel to the feed direction and substantially perpendicular to the first position and vice versa;
- a supporting plate supporting a side of the bottle groups corresponding to a rest side of the bottles and perpendicular to the axes of the bottles, the supporting plate being arranged to have a first position where the supporting plate is oriented in the feed direction as an extension of the conveyor and further swings from said first position to a second position where said supporting plate is vertical and vice versa; and
- at least one actuator for a swinging motion of the abutment surface and of the supporting plate, the actuator moving angularly the abutment surface and the supporting plate between the corresponding first position and the corresponding second position in a synchronized manner with each other and such to maintain, between the abutment surface and the supporting plate, a relative angular position substantially constant during the swinging motion between said first and said second position;
- said abutment surface and said supporting plate being members independent from each other.

8. The plant according to claim 7, wherein the at least one actuator is combined with the first station for displacing the bottle groups in the laid down position in the feed direction towards the strapping station.

9. The plant according to claim 7, wherein the abutment surface is provided radially protruding from a central hub rotatably supported on a shaft and driven so as to rotate by a second motor.

10. The plant according to claim 7, wherein the supporting plate is cyclically displaceable along a roto-translatory annular path from the first position of the supporting plate to the second position of the supporting plate and vice versa.

11. The plant according to claim 7, wherein the at least one actuator displacing the bottle groups from the first station to a following holding channel, by which the bottle groups are fed to the strapping station, comprises one or more pushing members acting on a rear side of a group of laid down bottles, with reference to the feed direction.

12. The plant according to claim 11, wherein the one or more pushing members are composed of the supporting plates, each supporting plate being mounted on a carriage of a sequence of movable carriages which are moved at a predetermined distance from each other along a closed annular path having axes parallel to one another and to a swing axis of the abutment surface.

13. The plant according to claim 12, wherein the annular path has a straight or substantially straight branch oriented in the feed direction of the bottle groups towards an entry of the holding channel combined with the strapping station, and a return branch for the movable carriages in a position directly adjacent to an exit of the conveyor provided upstream of the first station, said movable carriages being further rotated about a horizontal axis to angularly move the supporting plate from said first position receiving the bottle groups to the second position corresponding to the laid down position of the bottle group.

14. The plant according to claim 12, wherein a swinging rotation of the supporting plates of the movable carriages between an entry position of the bottle groups, where the supporting plate is horizontal, and the bottles of a group are oriented in upright position between a first horizontal position of the supporting plate, and the second position where said supporting plate is vertical and where the bottle group has been laid down laterally forwards, occurs at an initial end of a straight portion of the annular path, then the moving carriage in said laid down position is caused to be advanced along the straight portion of the annular path till placing the bottles in an entry section of the holding channel of the first station, while at a terminal end of the straight branch of the annular path of the moving carriages, there is provided a beginning of a return curved path that brings back the moving carriages to the initial position of the straight branch, ready to load a bottle pack fed by the conveyor.

15. The plant according to claim 14, wherein said annular path is composed of a curved track or guide starting at a terminal end of the straight branch portion of the annular path and ending at the initial end of said straight portion of the path and along which each carriage is transported by a motorized device, while being contemporaneously swung such to swing the supporting plate between two horizontal and vertical positions.

16. The plant according to claim 15, wherein there are provided several moving carriages and several abutment walls, for each abutment wall a carriage being provided, a supporting plate, the abutment walls and a pair of straight tracks parallel to each other being combined with each carriage, the pairs of straight tracks of the moving carriages being arranged coaxially to an axis of rotation of a rotating body and forming a polygon concentric to said axis of rotation and oriented horizontally and perpendicularly to the feed direction of the bottles, a motorized system being provided for an angular rotation of said rotating body by rotation steps corresponding to an angle comprised between two subsequent pairs of tracks.

17. The plant according to claim 3, wherein in the second station for turning over the bottle groups that have been provided with the one or more straps, from the laid down position to the upright position again, the turning over of the bottle groups from the laid down position to the upright position occurring by an angular movement forwards and downwards about a horizontal axis coinciding with or in proximity to the side of the bottle group provided at mouths of the bottles and in a forward position in the holding channel.

18. The plant according to claim 17, further comprising a turning over wheel that has at least one radial supporting plate having a first horizontal position aligned with a bottom side of the holding channel and, on the radial supporting plate, the groups of bottles coming from the holding channel are transferred in sequence, said radial supporting plate being angularly displaceable from the horizontal position to the vertical position by a downward rotation, while on a radially external side, bottom sides of the bottles of the group run on a circumferential curved sliding wall that is coaxial to a swing axis of the radial supporting plate, the sliding wall ending with a leading end towards a horizontal transport surface of a conveyor placed directly underneath the supporting wall in its vertical position.

19. A system comprising:
a plant according to claim 1, and
a fourth station forming groups of two bottles side by side and bound by at least one strap,
wherein said station is provided upstream of the plant and forms said groups of pairs of bottles and feeding the conveyor feeding the bottles and the devices that assemble and prearrange a flow of the bottles along said conveyor such to form the bottle groups with a number of the bottles and with a relative position of the bottles of the group identical to that of a final pack, with said pairs of bottles joined by at least one strap, the bottles being arranged on several rows and thepairs of the bottles bound with each other being fed on at least one row, while each bottle group has inside at least one pair of bottles bound to each other by the at least one strap.

20. The system according to claim 19, wherein the fourth station binding two bottles with each other comprises:

a grouping/assembling conveyor sorting area,
a fifth station laying down the pairs of bottles with a resting side facing forwards,
a sixth station feeding the bottles to the strapping station, and
a seventh station turning over the pairs of bottles bound to each other by a strap from the laid down position to the upright position.

21. The system according to claim 20, wherein the fifth station is composed of a stationary inclined cam cooperating with upper ends of one pair of the bottles placed side by side, the stationary inclined cam being provided at an exit end and an adjacent entry end of two conveyor belts of which downstream one, with reference to the feed direction, has a transport surface at a level lower than an upstream one.

22. The system according to claim 20, wherein the seventh station turning over the pairs of bottles bound with each other by the strap from the laid down position to the upright position comprises two conveyor belts, of which a downstream one has a transport surface at a level lower than a level of an upstream one, and a unit with lifting bars rotating on a closed path and engaging ends of cap of the pairs of bottles by moving the bottles to the upright position and the bars of the unit moving in a synchronized manner with the two conveyor belts.

* * * * *